(12) United States Patent
Bettzuege et al.

(10) Patent No.: US 11,142,122 B2
(45) Date of Patent: Oct. 12, 2021

(54) GRIPPING DEVICE FOR A VEHICLE

(71) Applicant: Volkswagen Aktiengesellschaft, Wolfsburg (DE)

(72) Inventors: Thomas Bettzuege, Wanzleben (DE); Christian Jachmann, Koenigslutter (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/013,434

(22) Filed: Sep. 4, 2020

(65) Prior Publication Data

US 2021/0061169 A1     Mar. 4, 2021

(30) Foreign Application Priority Data

Sep. 4, 2019   (DE) ..................... 10 2019 213 383.5

(51) Int. Cl.
  *B60Q 3/217*   (2017.01)
  *F21V 8/00*    (2006.01)
  *B60R 13/02*   (2006.01)
  *B60J 5/04*    (2006.01)

(52) U.S. Cl.
  CPC ............ *B60Q 3/217* (2017.02); *B60J 5/0469* (2013.01); *B60R 13/0243* (2013.01); *G02B 6/001* (2013.01); *G02B 6/0006* (2013.01)

(58) Field of Classification Search
  CPC ...... B60Q 3/217; G02B 6/0006; G02B 6/001; B60J 5/0469; B60R 13/0243
  See application file for complete search history.

(56) References Cited

FOREIGN PATENT DOCUMENTS

| | | |
|---|---|---|
| DE | 199 28 201 A1 | 12/2000 |
| DE | 10 2004 062 918 A1 | 7/2006 |
| DE | 10 2005 055 059 A1 | 5/2007 |
| DE | 10 2014 117 909 A1 | 6/2016 |
| EP | 0931698 A2 * | 7/1999 ........... B60Q 1/2669 |
| EP | 1 790 528 A1 | 5/2007 |

* cited by examiner

*Primary Examiner* — Joseph L Williams
(74) *Attorney, Agent, or Firm* — Muncy, Geissler, Olds & Lowe, P.C.

(57) ABSTRACT

A gripping device for a vehicle, including a housing element with a user-accessible contact surface and a user-inaccessible inner surface and at least one light conducting element for providing an ambience illumination at the gripping device, the light conducting element being fastened to the housing element. For this purpose, it is provided according to the invention that a groove for accommodating the light conducting element is formed on the contact surface of the housing element in such a way that a user-accessible contact side of the light conducting element completes the contact surface in a flush and uninterrupted manner in an opening area of the groove on the contact surface of the housing element.

15 Claims, 5 Drawing Sheets

GRIPPING DEVICE FOR A VEHICLE

This nonprovisional application claims priority under 35 U.S.C. § 119(a) to German Patent Application No. 10 2019 213 383.5, which was filed in Germany on Sep. 4, 2019, and which is herein incorporated by reference.

BACKGROUND OF THE INVENTION

Field of the Invention

The present invention relates to a gripping device for a vehicle, a panel component for a vehicle, including a corresponding gripping device, as well as a vehicle, including a gripping device of this type.

Description of the Background Art

Gripping devices for vehicles are generally known. Modern gripping devices are increasingly provided with light elements and/or light conducting elements to improve the ability to locate the gripping devices. The light conducting elements are often used in the rear area of the grips to facilitate an indirect illumination of the grips, a so-called ambience illumination. Elongated light conductors are increasingly used as light conducting elements, which are fastened to a surface of the gripping devices that face away from the user but are nevertheless grippable, to permit an indirect illumination of the grips. Exposed latching tabs are uses as fastening elements. However, the fasting of the light conducting elements has negative effects on the haptics of the gripping devices. In other known gripping devices, the light conductors are located under the contact surface of the gripping devices. The light is emitted from side openings, which are less haptically disruptive. However, the illumination result suffers thereby.

SUMMARY OF THE INVENTION

It is therefore an object of the present invention to provide an improved gripping device for a vehicle, which at least partially overcomes the aforementioned disadvantages. In particular, the object of the invention is to pride an improved gripping device for a vehicle, which generates improved haptics and an improved illumination result. The object of the invention is also to provide an improved panel component for a vehicle, which includes a corresponding gripping device, as well as an improved vehicle, which includes a gripping device of this type.

The object according to an exemplary embodiment of the invention is achieved by a gripping device for a vehicle. The object of the invention is also achieved by a panel component for a vehicle, which includes a corresponding gripping device, as well as by a vehicle, which in includes a gripping device of this type, Features which are disclosed with respect to the individual aspects of the invention may be combined with each other in such a way that reference always is or may be made interchangeably with respect to the disclosure of the aspects of the invention.

The invention provides a gripping device for a vehicle, including a housing element with a user-accessible contact surface and a user-inaccessible inner surface and at least one light conducting element for providing and ambience illumination at the gripping device, the light conducting element being fastened to the housing element. For this purpose, it is provided according to the invention that a groove for accommodating the light conducting element is formed on the contact surface of the housing element in such a way that a user-accessible contact side of the light conducting element completes the contact surface in a flush and essentially uninterrupted manner in an opening area of the groove on the contact surface of the housing element.

A gripping device within the meaning of the invention may be designed, in particular, as a gripping device for an interior of a vehicle. The gripping device may comprise a stationary or a movable gripping body.

Within the scope of the invention, the user-accessible contact surface of the housing element is preferably used in the rear area of the gripping device, which is visible to but cannot be gripped by the user from the interior of the vehicle.

A flush completion within the meaning of the invention means that the user-accessible contact side of the light conducting element and the contact surface of the housing element form a nearly continuous, essentially smooth, surface of the gripping device.

An uninterrupted completion within the meaning of the invention means that no exposed notches are formed on the sides of the groove between the contact side of the light conducting element and the contact surface of the housing element. In other words, an uninterrupted completion within the meaning of the invention means that a uniform, preferably narrow gap (⅓₀ to ½₀ of the width of the contact side of the light conducting element) is formed between the contact side of the light conducting element and the contact surface of the housing element.

The invention recognizes that a smooth surface of the gripping device plays an essential role in the haptics when touching the gripping device. To achieve a haptic feeling of a smooth surface of the gripping device, the invention proposes to embed the light conducting element in a recessed groove or in a trench on the contact surface of the gripping device in such a way that the user does not feel any notches and/or latching tabs.

The idea of the invention is to form the groove for accommodating the light conducting element with a smooth contour, which is adapted to the shape of the light conducting element in the opening area of the grove on the contact surface of the housing element, without any projecting notches for possible fastening elements. The idea of the invention is furthermore that the light conducting element is embedded in the groove in such a way that no projecting edges are formed on the contact surface of the housing element which could disturb the haptics when touching the gripping device. Within the scope of the invention, it is particularly advantageous that the user-accessible contact side of the light conducting element completes the contact surface of the housing element in a flush and essentially uninterrupted manner, which is associated with a haptic feel of a smooth surface of the gripping device.

In the case of a gripping device, the invention may also provide that the gripping device is designed in the form of a door-closing grip or a holding grip. The invention may be advantageously used everywhere in the interior of the vehicle where a gripping device may be employed.

In the case of a gripping device, the invention may furthermore provide that the light conducting element is designed in the form of a light conductor, in particular an optical waveguide, preferably an optical fiber. A light conducting element of this type is a simple and cost-effective component, which may be easily laid over curved surfaces and which may provide a uniform illumination along its length. An attractive, unobtrusive and indirect ambience illumination may be provided at the gripping device with the aid of a light conducting element of this type.

In the case of a gripping device, the invention may furthermore provide that the groove on the contact surface of the housing element has an, in particular, smooth contour, the contour being adapted to a corresponding contour of the contact side of the light conducting element in the opening area of the groove on the contact surface of the housing element. A haptic feel of a smooth surface of the gripping device may thus be facilitated not only when touching but also when passing a hand over the contact surface of the housing element.

In the case of a gripping device, the invention may also provide that a circumferential gap is formed in the opening area of the groove on the contact surface of the housing element between the contact side of the light conducting element and the contact surface of the housing element, which lengthwise has a uniform width or is provided with a uniform design. Due to a uniform, preferably narrow, gap, it is possible to avoid feeling edges between the contact side of the light conducting element and the contact surface of the housing element.

In the case of a gripping device, the invention may furthermore provide that the gap between the contact side of the light conducting element and the contact surface of the housing element is less than 1 mm, in particular less than 0.5 mm, preferably less than 0.1 mm. A preferably unobtrusive transition between the contact side of the light conducting element and the contact surface of the housing element may be facilitated thereby.

In the case of a gripping device, the invention may furthermore provide that the gap has a width which is at least 20 times smaller, in particular 30 times smaller, than a width of the contact side of the light conducting element in the opening area of the groove on the contact surface of the housing element. A preferably flush arrangement of the light conducting element with respect to the contact surface of the housing element may thus be facilitated.

The invention of a gripping device may further provide that a base of the groove has multiple, in particular repeating and/or evenly spaced interruptions on the inner surface of the housing element. This permits not only an advantageous fastening of the light conducting element embedded in the groove but also an easy manufacturing of the gripping device, in particular the housing element, including corresponding latching elements in the interruptions.

The invention of a gripping device may furthermore provide that latching elements are formed in the interruptions of the groove for fastening the light conducting element. This makes it possible to form the latching elements in an only two-part mold in only one method step, without having to use a slide valve.

Within the scope of the invention, it is also conceivable in a gripping device that the latching elements may be recessed with respect to the contact surface of the housing element in the direction of the inner surface. The user is thus unable to feel the latching elements, which permits pleasant haptics on the contact surface of the gripping device.

In addition, the invention of a gripping device may provide that the latching elements are arranged within a width of the groove, viewed in cross section with respect to the extension direction of the groove. This ensures that all fastening elements for the light conducting element, including the groove as well as the latching elements, are within the width of the groove, without forming projecting notches on the sides of the groove.

In the case of a gripping device, the invention may also provide that the latching elements are provided in pairs in the interruptions of the groove for the purpose of enclosing the light conducting element on both sides. This permits an easy and fast fastening of the light conducting element in the groove by simply inserting the light conducting element between the corresponding latching elements, which are provided in pairs along the groove.

In the case of the gripping device, the invention may also provide that the latching elements have a flexible design. In this way, not only an easy and fast but also a gentle fastening of the light conducting element in the groove may be facilitated without having to press the light conducting element onto the latching hooks of the latching elements, which could easily damage the light conducting elements.

In the case of a gripping device, the invention may furthermore provide that a cover element is provided for the housing element, which, together with the housing element, forms a two-part gripping body designed with a hollow space. In this way, a lightweight gripping body having an attractive shape may be provided.

In the case of a gripping device the invention may also provide that the housing element is formed from a plastic, preferably from an acrylonitrile butadiene styrene copolymer (ABS for short), a polycarbonate (PC for short) or a thermosetting plastic. A lightweight component having a smooth surface may thus be provided, which may be provided with a coating, for example made from metal, e.g. chromium.

In the case of a gripping device, it is also conceivable within the scope of the invention that the housing element may be manufactured with the aid of an injection molding method. The gripping device may thus be easily, quickly and cost-effectively manufactured in large volumes.

The invention may furthermore provide a light source in one end of the groove for introducing light into the light conducting element. The light source may be used to introduce light into the light conducting element, which may be emitted into the surroundings uniformly over the surface of the light element. An attractive and pleasant ambience illumination may thus be facilitated at the gripping device.

In the case of the gripping device, the invention may also provide that the groove has a shell-shaped receptacle for the light source on at least one end. This may ensure that the light source may also be fastened to the housing element in a haptically unobtrusive manner, preferably flush with the contact surface of the housing element. Recessed, unobtrusive fastening elements may also be provided within the receptacle for the purpose of permitting a form-fitting and/or force-fitting fastening of the light source in the receptacle, for example by simple insertion.

Within the scope of the invention, it is conceivable that the light source may be designed in the form of a lamp, an LED or a laser diode. A cost-effective light source may thus be provided. With the aid of an LED or, in particular, with the aid of a laser diode, a flush light may be emitted, which may be introduced into the light conducting element preferably with few losses.

The invention furthermore provides a panel component for a vehicle, which includes a corresponding gripping device, as well as an improved vehicle, which includes a gripping device of this type. With the aid of the panel component according to the invention as well as the vehicle according to the invention, the same advantages are achieved, which were described above in connection with the gripping device according to the invention. In the present case, full reference is made to these advantages.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
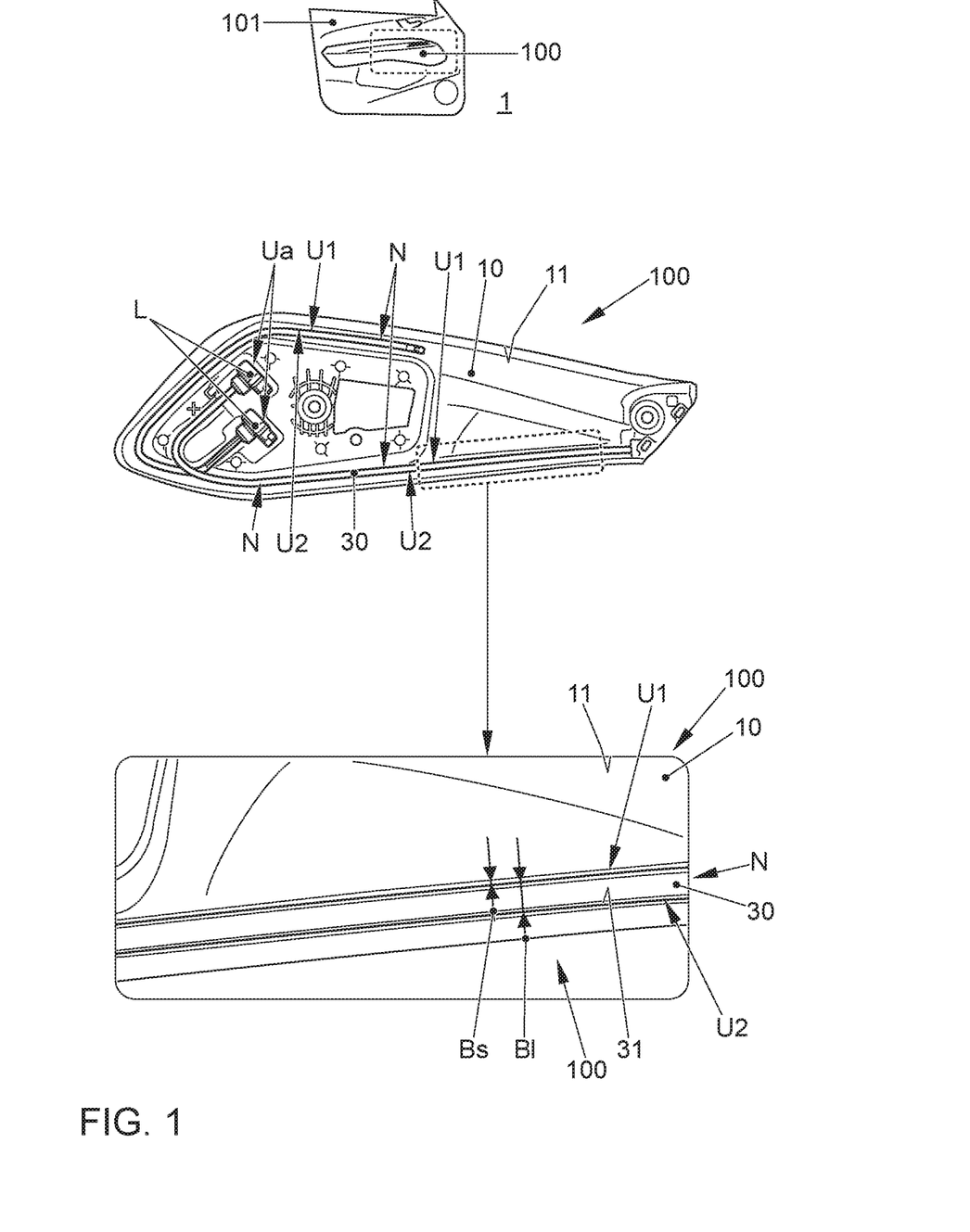
FIG. 1 shows a schematic representation of a gripping device according to the invention, with an enlarged top view of the gripping device from an outside of the gripping device in the area of a groove for a light conducting element.
Figure 3:
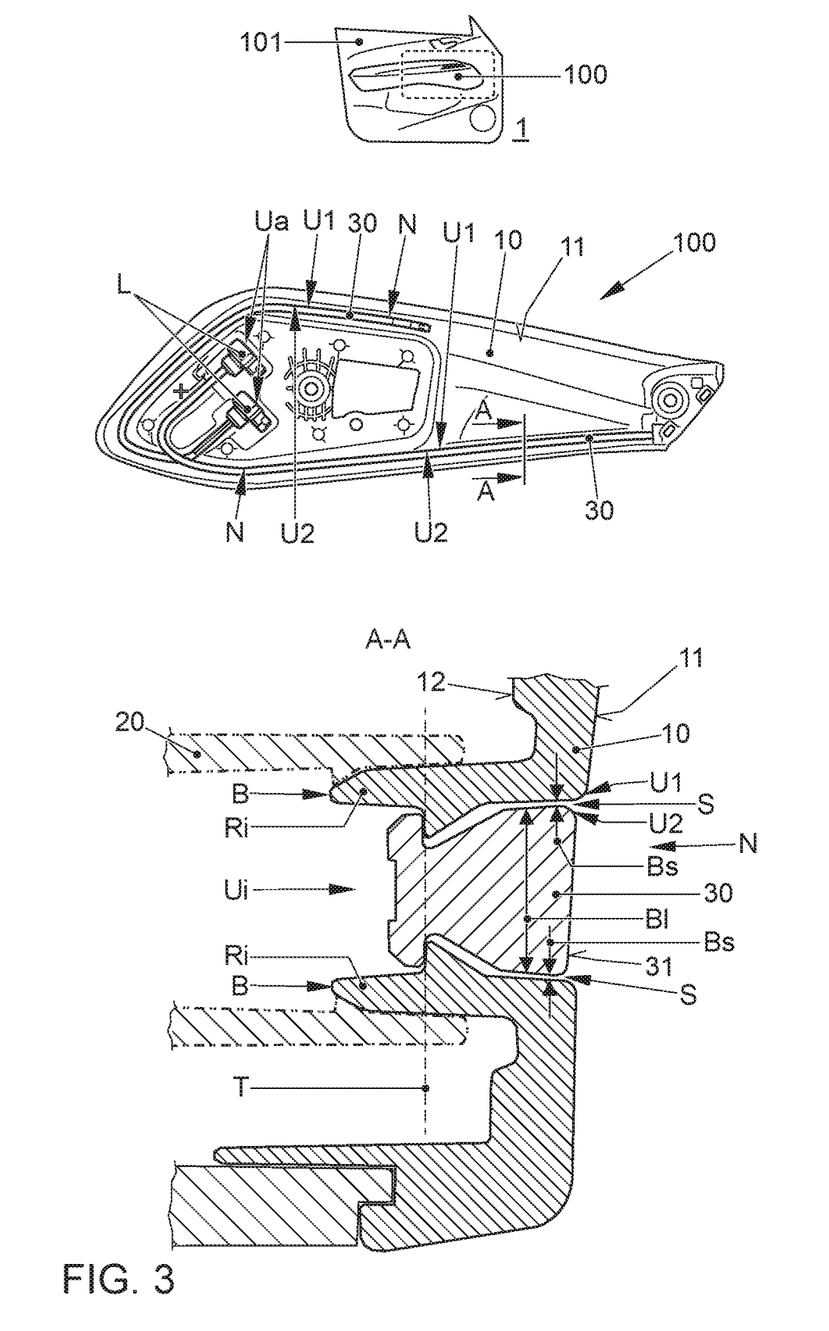
FIG. 3 shows a schematic representation of a gripping device according to the invention, with a cross-sectional view of the gripping device in the area of a groove for a light conducting element.
Figure 5:
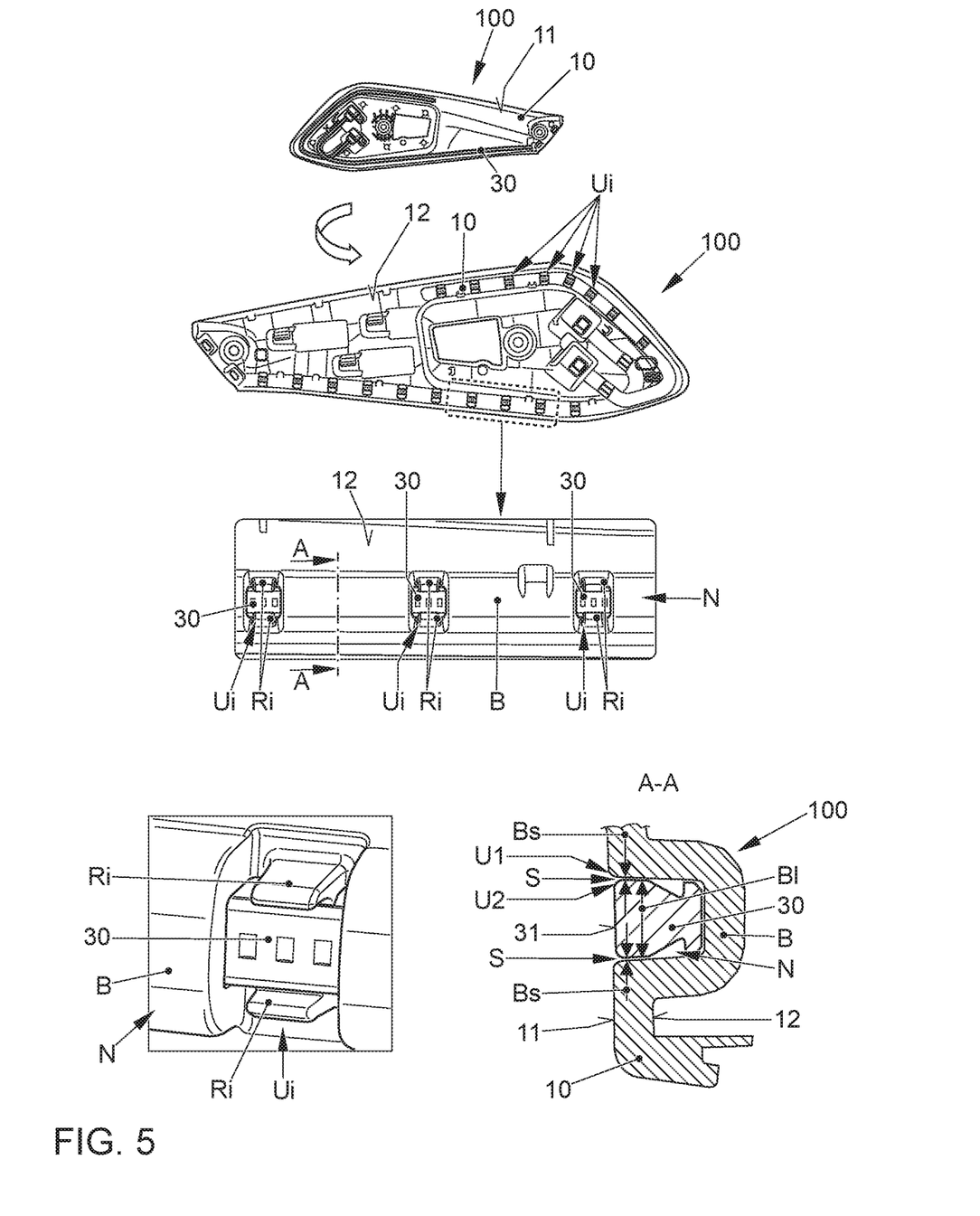
FIG. 5 shows a schematic representation of a gripping device according to the invention, with an enlarged top view of the gripping device from an inside of the gripping device as well as with a cross-sectional view of the gripping device in the area of a groove for a light conducting element.

FIGS. 1, 3 and 5 show a gripping device 100 according to the invention for a vehicle 1, which includes a housing element 10 having a user-accessible contact surface 11 and a user-inaccessible inner surface 12. FIGS. 1 and 3 show user-accessible contact surface 11, and FIG. 5 shows user-inaccessible inner surface 12 of housing element 10. User-accessible contact surface 11 of housing element 10 is inserted in the rear area of gripping device 100 facing away from an interior of vehicle 1, as indicated in the upper part of FIGS. 1 and 3.

In the upper part, FIGS. 1 and 3 show a panel component 101 within the meaning of the invention in the form of a vehicle interior door panel. Panel component 101 is designed with a gripping device 100 according to the invention in the form of a door-opening grip. Within the scope of the invention, it is further conceivable that a panel component 101 may be designed within the meaning of the invention in the form of a vehicle interior roof panel having a gripping device 100 according to the invention in the form of a holding grip for the user. Within the scope of the invention, it is conceivable, in principle, that a panel component 101 may represent within the meaning of the invention an arbitrary part of an interior panel of a vehicle, which may be designed with a gripping device 100 according to the invention, which has a stationary or movable gripping body.

Gripping device 100 according to the invention also includes at least one light conducting element 30. Two light conducting elements 30 are illustrated as examples in the illustrated exemplary embodiment in FIGS. 1, 3 and 5. Within the scope of the invention, however, it is also conceivable that only one or more than two light conducting elements 30 may be provided within the scope of the invention for providing an ambience illumination. The at least one or each of the multiple light conducting elements 30 (reference is also made to light conducting element 30 in general for reasons of simplicity) is disposed on contact surface 11 of housing element 10 in the rear area of gripping device 100, which is positioned in a concealed manner but is nevertheless grippable by the user.

The invention provides that a groove or a trench for accommodating light conducting element 30 is formed on contact surface 11 of housing element 10 in such a way that a user-accessible contact side 31 of light conducting element 30 completes contact surface 11 in a flush and essentially uninterrupted manner in an opening area of groove N on contact surface 11 of housing element 10 (cf. the cross-sectional representations of gripping device 100 according to the invention in FIGS. 3 and 5).

Figure 2:
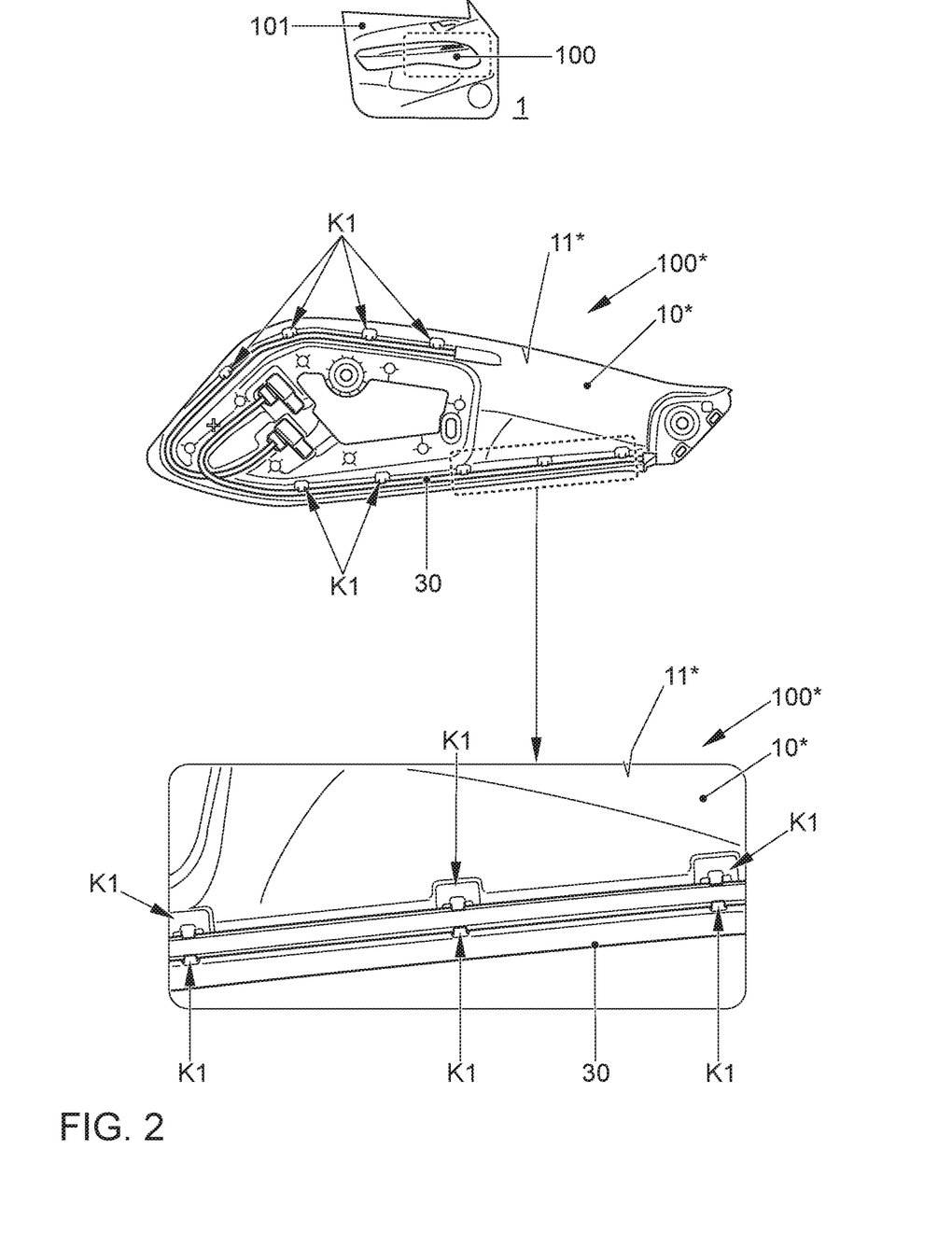
FIG. 2 shows a schematic representation of a known gripping device, with an enlarged top view of the gripping device from an outside of the gripping device in the area of a groove for a light conducting element.
Figure 4:
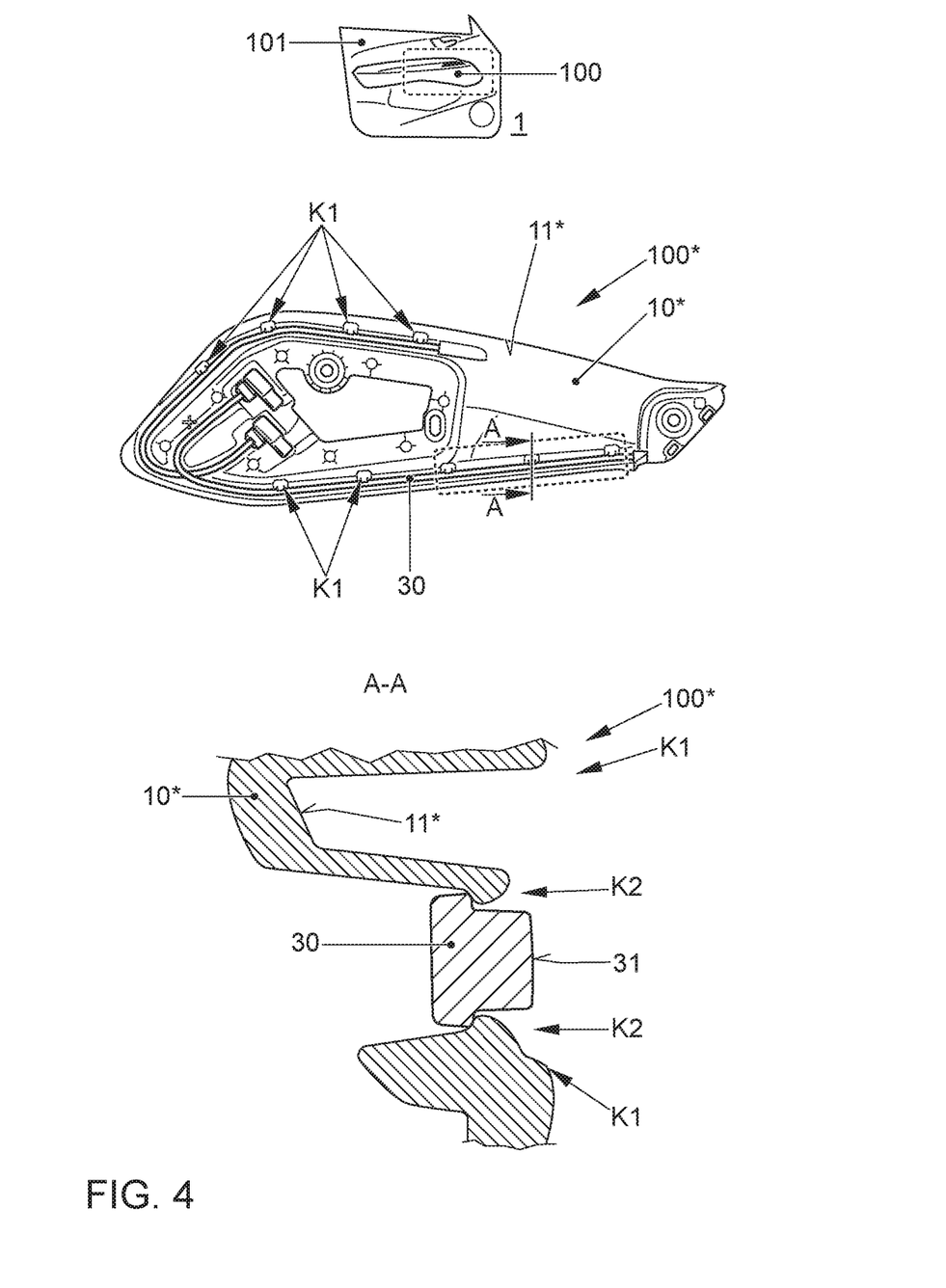
FIG. 4 shows a schematic representation of a known gripping device, with a cross-sectional view of the gripping device in the area of a groove for a light conducting element.

With the aid of the invention, essential advantages arise in terms of the haptics of gripping device 100 according to the invention, compared to a known gripping device 100*, which is illustrated as an example in FIGS. 2 and 4. In known gripping device 100*, exposed latching tabs K1 are used as fastening elements. However, a fastening of light conducting elements 30 in this manner has negative effects on the haptics of known gripping device 100*. First of all, exposed latching tabs K1 may be felt as notches, as illustrated by FIG. 2 in the enlarged cross-sectional representation of known gripping device 100* in the area of groove N*. Secondly, light conducting element 30 projects from contact surface 11* of housing element 10* (at least in areas on exposed latching tabs K1), so that edges K2 of light conducting element 30 may be felt.

With the aid of the invention, a smooth surface of gripping device 100 is advantageously provided. According to the invention, light conducting element 30 is embedded in groove N on contact surface 11 of gripping device 100 in such a way that the user is able to feel no latching tabs K1 and thus no notches and/or edges K2.

As shown in FIGS. 1 and 3, groove N has a smooth contour U1 for accommodating light conducting element 30, which is adapted to a corresponding contour U2 of contact side 31 of light conducting element 30 in the opening area of groove N on contact surface 11 of housing element 10.

Within the scope of the invention, light conducting element 30 may be designed in the form of a light conductor. for example an optical waveguide, preferably an optical fiber.

As illustrated in FIGS. 3 and 5, a circumferential, in particular uniform, gap S, which has an equal width Bs lengthwise, may be formed in the opening area of groove N on contact surface 11 of housing element 10 between contact side 31 of light conducting element 30 and contact surface 11 of housing element 10.

In the case of a gap S within the scope of the invention, it is conceivable that it is less than 1 mm, in particular less than 0.5 mm, preferably less than 0.1 mm. In the case of a gap S within the meaning of the invention, it is also conceivable that gap S has a width Bs, which is at least 20 times smaller, in particular at least 30 times smaller, than a width B1 of contact side 31 of light conducting element 30 in the opening area of groove N on contact surface 11 of housing element 10.

As illustrated in FIG. 3 in the cross-sectional representation of groove N as well as in FIG. 5 in the top view of inner surface 12 of housing element 10, a base B of groove N may have multiple, in particular repeating, interruptions Ui on inner surface 12 of housing element 10.

Latching elements Ri may advantageously be formed in interruptions Ui of groove N for fastening light conducting element 30. Due to interruptions Ui, it is made possible that latching elements Ri may be formed in a two-part mold in only one method step, without having to use a slide valve. The two mold halves may be opened at parting line T indicated schematically in FIG. 3.

It is furthermore apparent from FIGS. 3 and 5 that latching elements Ri may be recessed with respect to contact surface 11 of housing element 10 in the direction of inner surface 12.

As is also illustrated in FIG. 3 in the cross-sectional representation of groove N, latching elements Ri may be arranged within a width of groove N, viewed in cross section with respect to the extension direction of groove N. This makes it possible to avoid projecting notches on the sides of groove N.

In the cross-sectional representation of groove N, FIG. 3 also shows that latching elements Ri may be provided in pairs in interruptions Ui of groove N for the purpose of enclosing light conducting device 30 on both sides. It is furthermore conceivable that latching elements Ri may have a flexible design to avoid damage to light conducting element 30 at latching elements Ri when fastening light conducting element 30 in groove N.

As indicated by the dash-dot line in FIG. 3, a cover element 20 may be provided for housing element 10, which, together with housing element 10, may form a two-part gripping body designed with a hollow space.

Within the scope of the invention, it is conceivable that housing element 10 may be manufactured together with groove N from a plastic, preferably from an acrylonitrile butadiene styrene copolymer (ABS for short), a polycarbonate (PC for short) or from a thermosetting plastic. An injection molding method may be used for this purpose.

Furthermore, a light source L may be provided for light conducting element 30 (or one light source L for each light conducting element 30), for the purpose of introducing light into light conducting element 30. Groove N may have a shell-shaped receptacle Ua for light source L on at least one end for fastening light source L. Light source L may also be advantageously fastened to housing element 10 in a haptically unobtrusive manner, preferably flush with contact surface 11 of housing element 10. Light source L may be designed in the form of a lamp, an LED or a laser diode.

The above explanation of the specific embodiments describes the present invention exclusively within the scope of examples. Individual features of the specific embodiments may, of course, be freely combined with each other if technically reasonable, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A gripping device for a vehicle, the gripping device comprising:
    a housing element;
    a user-accessible contact surface and a user-inaccessible inner surface;
    at least one light conducting element for providing an ambience illumination at the gripping device, the light conducting element being fastened to the housing element; and
    a groove for accommodating the light conducting element formed on a contact surface of the housing element such that a user-accessible contact side of the light conducting element completes the contact surface in a flush and uninterrupted manner in an opening area of the groove on the contact surface of the housing element.

2. The gripping device according to claim 1, wherein the gripping device is designed in the form of a door-closing grip or a holding grip, and/or wherein the light-conducting element is designed in the form of a light conductor.

3. The gripping device according to claim 1, wherein the groove has a contour on the contact surface of the housing element, the contour being adapted to a corresponding contour of a contact side of the light conducting element in an opening area of the groove on the contact surface of the housing element.

4. The gripping device according to claim 1, wherein a circumferential gap, which has an equal width lengthwise, is formed in the opening area of the groove on a contact surface of the housing element between the contact side of the light conducting element and a contact surface of the housing element.

5. The gripping device according to claim 4, wherein the gap between the contact side of the light conducting element and the contact surface of the housing element is less than 1 mm,
and/or the gap has a width, which is at least 20 times smaller than a width of the contact side of the light conducting element in the opening area of the groove on the contact surface of the housing element.

6. The gripping device according to claim 1, wherein a base of the groove has multiple interruptions on an inner surface of the housing element.

7. The gripping device according to claim 6, wherein latching elements are formed in the interruptions of the groove for fastening the light conducting element.

8. The gripping device according to claim 7, wherein the latching elements are recessed with respect to the contact surface of the housing element in the direction of the inner surface, and/or wherein the latching elements are arranged within a width of the groove viewed in cross section with respect to the groove.

9. The gripping device according to claim 7, wherein the latching elements are provided in pairs in the interruptions of the groove for the purpose of enclosing the light conducting element on both sides, and/or wherein the latching elements are provided with a flexible design.

10. The gripping device according to claim 1, wherein a cover element is provided for the housing element, which, together with the housing element, forms a two-part gripping body designed with a hollow space.

11. The gripping device according to claim 1, wherein the housing element is formed from a plastic, and/or wherein the housing element is manufactured with the aid of an injection molding method.

12. The gripping device according to claim 1, wherein a light source is arranged on an end of the groove for introducing light into the light conducting element.

13. The gripping device according to claim 12, wherein the groove has a shell-shaped receptacle for the light source on at least one end, and/or wherein the light source is designed in the form of a lamp, an LED or a laser diode.

14. A panel component for a vehicle, which includes a gripping device according to claim 1.

15. A vehicle, which includes a gripping device, according to claim 1.

* * * * *